United States Patent Office 2,739,048
Patented Mar. 20, 1956

2,739,048

COLOR STABILIZATION OF LEADED INHIBITED GASOLINE EMPLOYING ARYL DERIVATIVES OF HYDROQUINONE AND 1,4-BENZOQUINONE

John W. Thompson and Donald J. Shields, Kingsport, Tenn., assignors to Eastman Kodak Company, Rochester, N. Y., a corporation of New Jersey No Drawing. Application March 28, 1952, Serial No. 279,214

7 Claims. (Cl. 44—59)

This invention relates to the use of aryl substituted derivatives of hydroquinone and p-benzoquinone as color stabilizers for gasoline compositions containing tetraethyl lead and arylamine antioxidants.

The employment of color stabilizers for gasoline containing tetraethyl lead and arylamine antioxidants is well known. U. S. 2,512,297 discloses the employment of piperidine as a color stabilizer against changes in color which occur on the exposure to sunlight of finished aviation fuels containing N,N'-di-sec. butyl-p-phenylenediamine as the antioxidant. U. S. 2,461,972 discloses the addition of a small amount of hydroquinone or quinhydrone to gasoline containing tetraethyl lead in conjunction with a suitable gum inhibitor or antioxidant such as N-n-butyl-p-aminophenol for the alleged purpose of effectively protecting leaded gasolines against the formation of haze or precipitate without affecting the other properties of such gasolines. U. S. 2,410,829 discloses gasolines which contain tetraethyl lead and an aromatic amine as an antioxidant or gum inhibitor and containing as an additional agent 2,4-dialkylphenols or 2,4,6-trialkylphenols which stabilize the aromatic amine inhibitor. U. S. 2,395,382 is similar to U. S. 2,410,829 except that the aromatic amine is an alkyl phenylenediamine, e. g. N,N'-di-sec. butyl-p-phenylenediamine. U. S. 2,409,171 discloses the stabilization of gasoline containing tetraethyl lead to prevent the formation of haze by the addition of hydroquinone or quinhydrone; however, this patent does not cover any such combination including an arylamine antioxidant.

U. S. 2,324,186 discloses the employment of various compounds as antioxidants for organic substances subject to deterioration; it is stated that gasoline is such an organic substance. Among the numerous compounds disclosed by U. S. 2,324,186 is 2,5-dihydroxy biphenyl which is phenylhydroquinone, but no mention is made of the employment of phenylhydroquinone in gasoline containing an arylamine antioxidant or gum inhibitor; in fact, the disclosure of this patent is primarily restricted to the stabilization of rubber and rubber compositions.

The prior art indicates that there is no reliable relationship between the inhibition of gum formation, the stabilization of haze formation due to decomposition of tetraethyl lead, and the formation of color due to miscellaneous possible reactions in gasoline containing tetraethyl lead, lead scavengers and gum inhibitors or antioxidants. None of the prior art discussed above relates to the employment of aryl-substituted derivatives of hydroquinone or p-benzoquinone as color stabilizers in gasoline containing tetraethyl lead and an antioxidant of the class which can be considered to be a derivative of aniline.

We have now found that the color stability of gasoline can be greatly improved by adding an aryl derivative of hydroquinone or p-benzoquinone to a gasoline containing tetraethyl lead and an arylamine antioxidant such as N,N'-di-sec-butyl-p-phenylenediamine and N-n-butyl-p-aminophenol.

It is an object of our invention to provide a new efficacious class of color stabilizers for gasoline containing tetraethyl lead, a lead scavenger, and an arylamine antioxidant such as N,N'-di-sec-butyl-p-phenylenediamine and N,n-butyl-p-aminophenol. Other objects will become apparent from the following description:

The gasoline employed for motor fuels, especially for aviation engines, is subject to deterioration of color upon exposure to strong light such as sunlight when it contains arylamine antioxidants such as N,N'-di-sec. butyl-p-phenylenediamine. Such antioxidants are otherwise normally quite stable.

The color stabilizers of this invention are primarily effective in aviation motor fuels comprising gasoline, e. g. saturated hydrocarbons such as iso-octane, neohexane, reformed gasoline, hydroformed gasoline, polymer gasoline, straight-run gasoline, admixtures of two or more of such components of motor fuels, etc. Such motor fuels also contain tetraethyl lead and a lead scavenger such as ethylene dibromide as well as an arylamine antioxidant such as N,N'-di-sec. butyl-p-phenylenediamine. Such motor fuels have various octane ratings and are prepared so that they will give good performance in motors designed to operate with a motor fuel having a designated octane rating. In order to differentiate the various fuels having different octane ratings, dyes are added to the fuels such as blue dyes, green dyes and purple dyes. If the color changes due to exposure to sunlight the purpose of the identifying dye is nullified and the motor fuel may be erroneously employed in an engine designed for a different type of motor fuel with consequent deleterious results. By adding an aryl derivative of hydroquinone or p-benzoquinone to such motor fuels, these deleterious color changes can be effectively inhibited.

The blue, green and purple colors can be created in the aviation gasolines in accordance with standard military specification MIL-F-5572 (January 1950) which prescribes in paragraph 3.14 that no dyes other than the following shall be present in the finished fuel:

Blue: Essentially an alkyl substituted anthraquinone;
Yellow: Essentially p-dimethylaminoazobenzene;
Red: Essentially 2,3'-dimethylazobenzene-4'-azo-2-naphthol.

These dyes are also specified in A. S. T. M. Specifications for Aviation Gasoline (D910–52T) which names the same allowable dyes and states the maximum concentrations for various colors of gasoline as follows:

| Dye | Max. Concentration of Dye (mg./gal.) to Produce Gasoline Colors Specified | | | |
|---|---|---|---|---|
| | Red | Blue | Green | Purple |
| Blue dye | 0.75 | 8.5 | 7.0 | 7.0 |
| Yellow dye | none | none | 7.0 | none |
| Red dye | 8.65 | none | none | 3.27 |

Motor fuels of the type described above are thought to undergo changes in color due to a light-catalyzed reaction between such arylamine antioxidants as N,N'-di-sec. butyl-p-phenylenediamine and the lead scavenger such as ethylene dibromide which is present by reason of its existence in admixture with the tetraethyl lead fluid dissolved in the motor fuel. The reaction product appears to be a red-colored product which can completely change the normal color of the fuel as originally dyed, whereby mistakes in fuel grade identification are brought about and some deposition of solid products in the motor fuel may be caused.

The aryl derivatives of hydroquinone or p-benzoquinone which can be added in accordance with our invention are generally effective when present in the motor fuel in quantities on the order of 0.000003 to about 0.01 percent by weight of the aryl hydroquinone or p-benzoquinone based on the weight of the motor fuel. This color stabilizer can be added to the motor fuel after the addition of all of its other constituents or it can be added in admixture with other constituents of the motor fuel. It is advantageous to dissolve the color stabilizer in the antioxidant, which antioxidant composition can then be advantageously added to the motor fuel.

In order to illustrate the effectiveness of these aryl hydroquinone or p-benzoquinone derivatives as color stabilizers, 100 ml. portions of a representative aviation motor fuel of the type described above were exposed in clear glass bottles to sunlight with and without added aryl hydroquinone or p-benzoquinone derivatives being present as color stabilizers. The gasoline employed was a 100-octane fuel containing 2.9 ml. of tetraethyl lead fluid per gallon (this includes lead scavenger), a blue dye, and 0.0033 weight percent of N,N'-di-sec. butyl-p-phenylenediamine as the gasoline antioxidant. In all of the following examples the color stabilizers were added in the form of a benzene solution so as to result in 0.0000825 weight percent of the aryl hydroquinone derivative in the fuel.

*Example No. 1.*—A sample of the above-described fuel without any color stabilizer changed from blue to purple after an exposure of 7 minutes to sunlight.

*Example No. 2.*—p-Biphenyl hydroquinone was employed as the color stabilizer in the manner described above; the stabilized gasoline was still blue after 120 minutes' exposure.

*Example No. 3.*—Phenylhydroquinone was employed as the color stabilizer in the manner described above; the gasoline containing this stabilizer did not show a purple color for 23 minutes.

*Example No. 4.*—2,5-di-p-tolyl hydroquinone was employed as the color stabilizer in the manner described above. The gasoline stabilized did not show a color change for 15 minutes.

*Example No. 5.*—2,5-diphenyl hydroquinone was employed as the color stabilizer in the manner described above. The stabilized gasoline did not show a change from blue to red until 11 minutes had passed.

*Example No. 6.*—This example illustrates the color stabilizing activity of piperidine which is believed to be employed in some commercially available gasolines of the type described above. A portion of the unstabilized fuel employed in the preceding examples was treated with 0.0000825 percent by weight of piperidine. The gasoline containing piperidine changed from blue to purple in 9.5 minutes.

*Example No. 7.*—This example illustrates the fact that compounds which are known to have antioxidant properties in certain compositions of matter do not necessarily have color stabilizing properties in gasoline of the type referred to herein. Thus, portions of the fuel employed in the above examples were prepared so as to contain 0.0000825 weight percent of tertiary butyl hydroquinone in one sample, the same quantity of 2,5-di-tert. butyl hydroquinone in a second sample and the same quantity of cyclohexyl hydroquinone in a third sample. These samples changed to purple under conditions as employed in the above examples in about the same time as the control, viz., about seven minutes.

*Example No. 8.*—Phenyl-1,4-benzoquinone was employed as a color stabilizer in the manner described above except that the control and the sample tested contained 2.89 ml. of the tetraethyl lead fluid per gallon, otherwise the proportions were the same, viz. 0.0033% of N,N'-di-sec. butyl-p-phenylenediamine in blue dyed 100-octane aviation gasoline. The control sample turned from blue to wine red on seven minutes exposure in the manner described above. This same gasoline composition, to which 0.0000825% of phenyl-1,4-benzoquinone was added as a color stabilizer had not changed color noticeably after 90 minutes in sunlight.

*Example No. 9.*—To the same gasoline composition as in Example 8 was added 0.0000825% of p-biphenyl-1,4-benzoquinone. After 90 minutes of sunlight exposure it was still blue as contrasted to seven minutes before color change for the control.

In addition to the color stabilizers employed in the above examples, other compounds which can be similarly employed in accordance with this invention include 2,5-di-o-tolyl hydroquinone, 2,6-diphenyl hydroquinone, 2,5-bis (p-biphenyl) hydroquinone, 2,6-di-p-tolyl hydroquinone, 2,5-di-o-tolyl hydroquinone, 2,5-di-p-tolyl-1,4-benzoquinone, 2,5-diphenyl-1,4-benzoquinone, 2,6-di-o-tolyl-1,4-benzoquinone, etc.

The above examples make it quite clear that the most outstanding color stabilizer by far is p-biphenyl hydroquinone which stabilizes the gasoline tested for more than 17 times as long as the control containing no stabilizer.

As has been explained hereinabove, the motor fuels which can be advantageously stabilized in accordance with this invention include aviation motor fuels comprised substantially of saturated hydrocarbons, e. g. straight-run gasoline, neohexane, iso-octane, various treated and polymerized gasoline hydrocarbons, blends, etc. Such aviation motor fuels ordinarily contain from about 0.25 to about 10 cc. of tetraethyl lead per gallon of the motor fuel. A quantity of lead scavenger (ordinarily ethylene dibromide) is generally present in an amount chemically equivalent to the tetraethyl lead, e. g. from about 0.1 cc. to about 4 or 5 cc. per gallon of aviation fuel. The aviation motor fuel will also contain an arylamine antioxidant, e. g. N,N'-di-sec. butyl-p-phenylenediamine in the proportion of from about 0.001 percent to about 0.01 percent by weight of the motor fuel; this quantity will be proportional to a certain extent upon the amount of tetraethyl lead in the fuel which it tends to stabilize. In addition to such aviation motor fuels, other similar gasoline compositions can be analogously stabilized against color deterioration in accordance with this invention.

The color stabilizers which can be employed in accordance with this invention can be encompassed within the scope of the following general formulas:

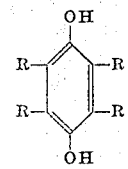

and

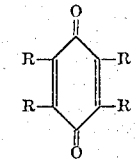

wherein at least one of the R substituents represents a member of the group consisting of aryl and alkaryl hydrocarbon radicals containing from 6 to 15 carbon atoms and the remaining R substituents represent a member of the group consisting of a hydrogen atom, aryl and alkaryl hydrocarbon radicals containing from 6 to 15 carbon atoms. Examples of these color stabilizer compounds have been given in many instances above.

We claim:

1. A motor fuel consisting essentially of substantially saturated hydrocarbons containing a dye used for coloring aviation motor fuels from about 0.25 to about 10 cc. of tetraethyl lead per gallon of the motor fuel which includes from about 0.1 cc. to about 5 cc. of ethylene dibromide per gallon of motor fuel, from about 0.001 percent to about 0.01 percent by weight of the motor fuel of N,N'-di-sec. butyl-p-phenylenediamine and from about 0.000003 to about 0.01 percent by weight of the motor fuel of a color stabilizer selected from the group consisting of those having one of the following formulas:

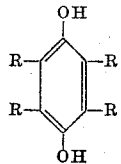

and

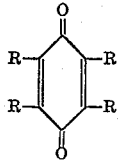

wherein at least one of the R substituents represents a member of the group consisting of aryl and alkaryl hydrocarbon radicals containing from 6 to 15 carbon atoms and the remaining R substituents represent a member of the group consisting of a hydrogen atom and aryl and alkaryl hydrocarbon radicals containing from 6 to 15 carbon atoms.

2. A motor fuel as defined in claim 1 wherein the color stabilizer is p-biphenyl hydroquinone.

3. A motor fuel as defined in claim 1 wherein the color stabilizer is p-biphenyl-1,4-benzoquinone.

4. A motor fuel as defined in claim 1 wherein the color stabilizer is phenyl hydroquinone.

5. A motor fuel as defined in claim 1 wherein the color stabilizer is phenyl-1,4-benzoquinone.

6. A motor fuel as defined in claim 1 wherein the color stabilizer is 2,5-di-p-tolyl hydroquinone.

7. A motor fuel consisting essentially of a substantially saturated hydrocarbon aviation motor fuel, a dye used for coloring aviation motor fuels, from about 0.25 to about 10 cc. of tetraethyl lead per gallon of the aviation motor fuel which includes from about 0.1 cc. to about 4 cc. of ethylene dibromide per gallon of aviation motor fuel, and from about 0.001 percent to about 0.01 percent by weight of the aviation motor fuel of N,N'-di-sec. butyl-p-phenylenediamine and from about 0.00001 to about 0.001 percent by weight of the aviation motor fuel of a color stabilizer selected from the group consisting of those having one of the following formulas:

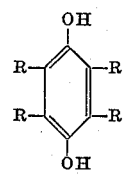

and

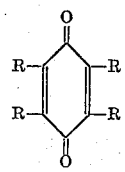

wherein at least one of the R substituents represents a member of the group consisting of aryl and alkaryl hydrocarbon radicals containing from 6 to 15 carbon atoms and the remaining R substituents represent a member of the group consisting of a hydrogen atom and aryl and alkaryl hydrocarbon radicals containing from 6 to 15 carbon atoms.

References Cited in the file of this patent
UNITED STATES PATENTS

| | | |
|---|---|---|
| 2,023,110 | Wilson | Dec. 3, 1935 |
| 2,054,276 | Wilson, Jr. | Sept. 15, 1936 |
| 2,608,476 | Strickland | Aug. 26, 1952 |